(12) United States Patent
Nara et al.

(10) Patent No.: US 11,619,262 B2
(45) Date of Patent: Apr. 4, 2023

(54) LINEAR MOTION GUIDE UNIT

(71) Applicant: NIPPON THOMPSON CO., LTD., Tokyo (JP)

(72) Inventors: Tsuguyoshi Nara, Mino (JP); Yusuke Yamaguchi, Mino (JP); Daisuke Sato, Mino (JP)

(73) Assignee: NIPPON THOMPSON CO., LTD., Tokyo (JP)

( * ) Notice: Subject to any disclaimer, the term of this patent is extended or adjusted under 35 U.S.C. 154(b) by 0 days.

(21) Appl. No.: 17/512,010

(22) Filed: Oct. 27, 2021

(65) Prior Publication Data
US 2022/0128089 A1 Apr. 28, 2022

(30) Foreign Application Priority Data

Oct. 27, 2020 (JP) .............................. JP2020-179782

(51) Int. Cl.
*F16C 29/00* (2006.01)
*F16C 29/06* (2006.01)

(52) U.S. Cl.
CPC .......... *F16C 29/005* (2013.01); *F16C 29/004* (2013.01); *F16C 29/064* (2013.01)

(58) Field of Classification Search
CPC ...... F16C 29/004; F16C 29/005; F16C 29/06; F16C 29/0604; F16C 29/0633; F16C 29/064
See application file for complete search history.

(56) References Cited

U.S. PATENT DOCUMENTS

| | | | | |
|---|---|---|---|---|
| 5,735,214 A | * | 4/1998 | Tsuboi | F16C 29/005 |
| | | | | 384/57 |
| 7,182,024 B2 | * | 2/2007 | Pfeiffer | F16C 29/045 |
| | | | | 238/10 R |

FOREIGN PATENT DOCUMENTS

| | | |
|---|---|---|
| JP | 2005233247 A | 9/2005 |
| JP | 2014194271 A | 10/2014 |
| JP | 6307831 * | 4/2018 |

* cited by examiner

*Primary Examiner* — James Pilkington
(74) *Attorney, Agent, or Firm* — Browdy and Neimark, PLLC (57) ABSTRACT

A linear motion guide unit includes a rail having a raceway groove extending on each longitudinal side surface, and a slider fitting over the rail and movable relative to the rail. The rail includes a first rail member and a second rail member connected to each other in a longitudinal direction at a connecting portion. The first rail member has, at least at one end, a protrusion extending in the longitudinal direction. The second rail member has, at least at one end, a notch to be combined with the protrusion. In the connecting portion, the protrusion of the first rail member is combined with the notch of the second rail member to connect the first rail member and the second rail member. The protrusion and the notch are fixed with a columnar member extending in a direction intersecting the longitudinal direction.

8 Claims, 7 Drawing Sheets

LINEAR MOTION GUIDE UNIT

BACKGROUND OF THE INVENTION

1. Field of the Invention

The present invention relates to a linear motion guide unit. The present application claims priority based on Japanese Patent Application No. 2020-179782 filed on Oct. 27, 2020, the entire contents of which are incorporated herein by reference.

2. Description of the Related Art

A linear motion guide unit includes a rail that extends linearly in a longitudinal direction and a slider that fits over the rail. The rail has a raceway groove formed on a longitudinal side surface thereof. The raceway groove formed on the rail and a raceway groove formed inside a sleeve portion of the slider to oppose the raceway groove of the rail form a load-carrying race therebetween. A plurality of rolling elements are enclosed in the load-carrying race. When the slider is to move on the rail, the rolling elements enclosed in the load-carrying race roll, whereby smooth sliding is realized.

For example in the case where a linear motion guide unit requires a long rail, a rail formed with a plurality of rail members connected in the longitudinal direction is used. As a manner of connecting a plurality of rail members, there are known rails in which, of opposing longitudinal end faces of adjacent rail members, one end face is provided with a convex portion and the other end face is provided with a concave portion corresponding to the convex portion, and the convex portion and the concave portion are fitted together to connect the adjacent rail members (see, for example, Patent Literature 1 and Patent Literature 2).

CITATION LIST

Patent Literature

Patent Literature 1: Japanese Patent Application Laid-Open No. 2014-194271
Patent Literature 2: Japanese Patent Application Laid-Open No. 2005-233247

SUMMARY OF THE INVENTION

In order to achieve a smooth operation of a linear motion guide unit, it is desirable that there is no unintentional unevenness in the load-carrying race. However, in the case of using a rail formed with a plurality of rail members connected to each other, a step may occur in the raceway groove at the connecting portion of the rail members. Thus, an object of the present invention is to provide a linear motion guide unit including a rail made up of a plurality of rail members connected together, which is capable of smooth operation in which the occurrence of a step in a connecting portion of the rail members is suppressed and the slider smoothly slides on the rail.

A linear motion guide unit according to the present disclosure includes:
a rail having a raceway groove extending on each longitudinal side surface thereof; and
a slider fitting over the rail and movable relative to the rail; wherein
the rail includes a first rail member and a second rail member connected to each other in a longitudinal direction at a connecting portion,
the first rail member has, at least at one end, a protrusion extending in the longitudinal direction,
the second rail member has, at least at one end, a notch to be combined with the protrusion, and
in the connecting portion,
the protrusion of the first rail member is combined with the notch of the second rail member to connect the first rail member and the second rail member, and
the protrusion and the notch are fixed with a columnar member extending in a direction intersecting the longitudinal direction.

The above-described linear motion guide unit provides a linear motion guide unit capable of smooth operation in which the occurrence of a step in the connecting portion of the rail members is suppressed and the slider slides smoothly on the rail.

DESCRIPTION OF THE PREFERRED EMBODIMENTS

Outline of Embodiments

Firstly, embodiments of the present disclosure will be listed and described. A linear motion guide unit of the present disclosure includes: a rail having a raceway groove extending on each longitudinal side surface thereof; and a slider fitting over the rail and movable relative to the rail. In the linear motion guide unit of the present disclosure, the rail includes a first rail member and a second rail member connected to each other in a longitudinal direction at a connecting portion. The first rail member has, at least at one end, a protrusion extending in the longitudinal direction, and the second rail member has, at least at one end, a notch to be combined with the protrusion. In the connecting portion, the protrusion of the first rail member is combined with the notch of the second rail member to connect the first rail member and the second rail member. The protrusion and the notch are fixed with a columnar member extending in a direction intersecting the longitudinal direction.

Conventionally, a rail composed of a plurality of rail members connected in a longitudinal direction is used in a linear motion guide unit. The rail members have raceway grooves formed on their longitudinal side surfaces. In the case of connecting the rail members having separately machined raceway grooves, misalignment during the assembly may cause a step in the raceway grooves at the connecting portion. Such a step in the raceway grooves can cause a malfunction of the linear motion guide unit. In order to solve this problem, grinding process has been performed on the raceway grooves in the state where the rail members are connected, to eliminate any step in the raceway grooves at the connecting portion.

To perform grinding of a raceway groove, specifically, a circular grinding stone is abutted against the raceway groove and advanced in the longitudinal direction of the rail. Conventionally, there were cases where, during such grinding process, the rail members connected would shift in the longitudinal direction at the connecting portion thereof. When the grinding process was continued with the rail members misaligned in the longitudinal direction, a slight error would occur in the connecting portion. There also was found a problem that, when such a linear motion guide unit was operated, the smoothness of the slider movement would be impaired when the slider was to move over to another rail member.

Thus, a rail member connecting structure was investigated that can prevent shifting of the rail members in the longitudinal direction even when grinding process is performed after connecting the rail members together. Then, it was found that the structure in which the rail members are connected through concave and convex portions provided in the longitudinal direction would not sufficiently prevent the shifting of the rail members in the longitudinal direction during the grinding process. An idea obtained was to secure the rail members to each other in a direction intersecting the longitudinal direction of the rail to thereby prevent the longitudinal misalignment thereof. Further, configurations were conceived such that in a rail member connecting portion, one rail member is provided with a protrusion and the other rail member is provided with a notch to be combined with the protrusion, and that the protrusion and the notch are fixed with a columnar member extending in a direction intersecting the longitudinal direction of the rail. It was then confirmed that with these configurations, a linear motion guide unit capable of smooth operation can be obtained in which a step is unlikely to occur in the connecting portion of the rail members and the slider slides smoothly on the rail.

With the configuration of the present disclosure, the longitudinal misalignment of the rail members during the grinding process can be prevented. According to the configuration of the present disclosure, a rail having a high accuracy in the connecting portion and few steps in the raceway grooves of the rail members can be obtained. Therefore, even in a linear motion guide unit including a long rail obtained by connecting a plurality of rail members, the slider slides smoothly on the rail, thereby realizing smooth operation. Further, according to the configuration of the present disclosure, opposing surfaces of the rail members can be obtained in any direction through designing of the shapes of the protrusions and the notches combined therewith, so that the configuration can be applied to a variety of linear motion guide units having different shapes of rails and raceway grooves.

In the linear motion guide unit of the present disclosure, the columnar member may be a pin or a screw.

When the columnar member is a pin or a screw, a linear motion guide unit can be obtained by a practical and rational design and producing method using parts that are generally used in mechanical devices such as linear motion guide units.

In the linear motion guide unit of the present disclosure, the direction in which the columnar member extends may be a direction orthogonal to the longitudinal direction of the rail.

The columnar member extending orthogonally to the longitudinal direction of the rail can reliably prevent the longitudinal misalignment of the rail members, and also enables production of a linear motion guide unit of stable quality using a commonly used machining technique.

In the linear motion guide unit of the present disclosure, the columnar member may be a screw. The first rail member and the second rail member may have surfaces opposing each other, the surface of the first rail member having a counterbored hole formed therein, the surface of the second rail member having a screw hole formed therein, and the screw may be inserted and screwed into the counterbored hole and the screw hole to connect the first and second rail members.

According to this configuration, the rail members can be securely fixed to each other by screwing the screw. Further, since the rail members can be fixed to each other without creating a portion that protrudes outwardly from the outer shape of the rail, there are no restrictions when the linear motion guide unit is attached to a counterpart device.

In the linear motion guide unit of the present disclosure, the columnar member may be a pin. The first rail member and the second rail member may have surfaces opposing each other, the surfaces each having a pin hole formed therein, and the pin may be inserted into the pin holes to connect the first and second rail members.

According to this configuration, the rail members can be securely fixed to each other through the fitting of the pin and pin holes. Further, since the rail members can be fixed to each other without creating a portion that protrudes outwardly from the outer shape of the rail, there are no restrictions when the linear motion guide unit is attached to a counterpart device. Moreover, there is no need to tighten the screw, which reduces the man-hours required for producing the linear motion guide unit.

The linear motion guide unit of the present disclosure may further include a key. The first rail member and the second rail member may have surfaces opposing each other, the surfaces each having formed therein a keyway being a recess and corresponding to the key, and the key may be fitted in the keyways.

The use of the key ensures the positioning between the rail members.

In the linear motion guide unit of the present disclosure, a combined surface of the protrusion and the notch may include a plurality of surfaces orthogonal to the longitudinal side surfaces of the rail.

This configuration ensures adequate rigidity of the rail and reliably prevents the longitudinal misalignment of the rail members, while minimizing the effect of connecting the rail members on the raceway grooves.

DESCRIPTION OF SPECIFIC EMBODIMENTS

Specific embodiments of the linear motion guide unit of the present disclosure will be described below with reference to the drawings. In the drawings referenced below, the same or corresponding portions are denoted by the same reference numerals and the description thereof will not be repeated.

Embodiment 1

Figure 1:
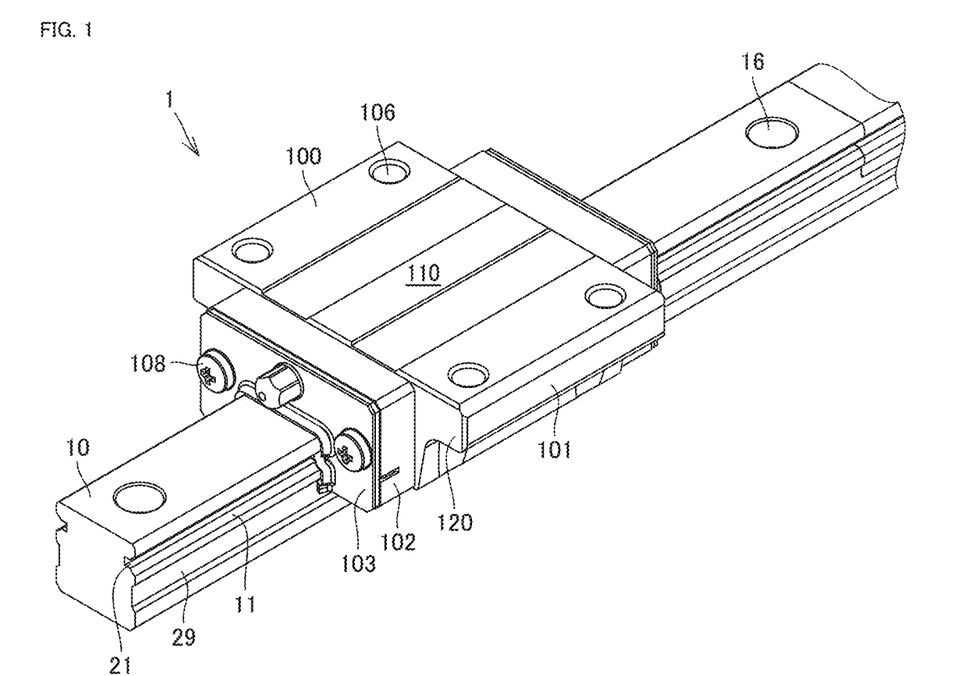
FIG. 1 shows the structure of a linear motion guide unit in Embodiment 1.
Figure 2:
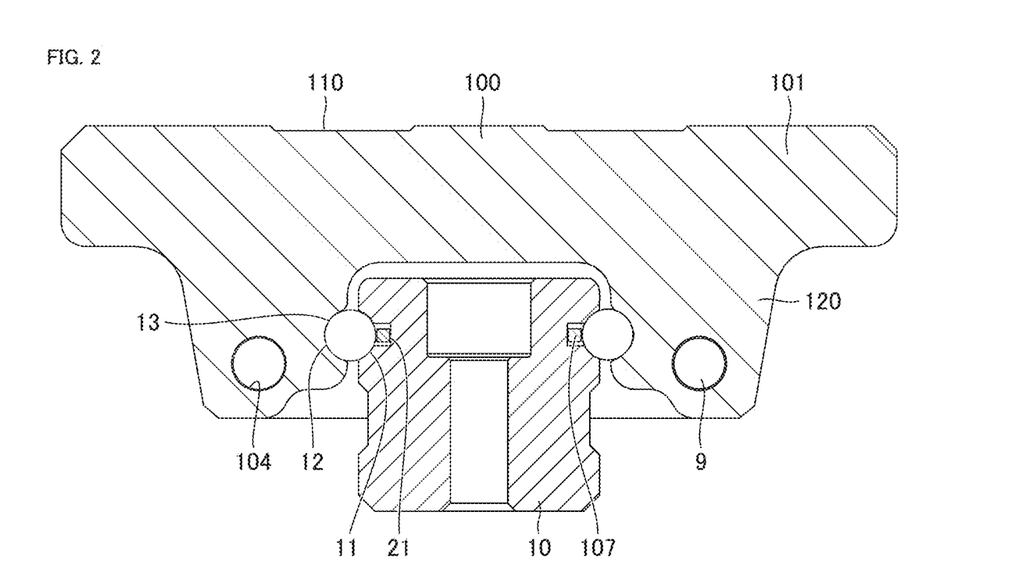
FIG. 2 shows a cross section of the linear motion guide unit in Embodiment 1.

Referring to FIGS. 1 and 2, a linear motion guide unit 1 of the present disclosure includes a rail 10 that has raceway grooves 11 formed on both longitudinal side surfaces 29, and a slider 100 that is movable relative to the rail 10. The slider 100, which fits over the rail 10, is composed of an upper portion 110 and a sleeve portion 120 hanging from each side of the upper portion. The sleeve portion 120 has an interior provided with a raceway groove 12 that opposes the raceway groove 11 of the rail 10. The raceway groove 11 and the raceway groove 12 form a load-carrying race 13 therebetween, and a plurality of rolling elements, balls 9, are incorporated in the load-carrying race 13.

The slider 100 has a carriage 101, an end cap 102, and a seal 103. The carriage 101, the end cap 102, and the seal 103 are fixed to each other with a bolt 108. The carriage 101 has formed therein a first circulation passage 104 parallel to the load-carrying race 13. The carriage 101 has a plurality of screw holes 106 formed for mounting a counterpart member such as a work or equipment. The end cap 102 is disposed on each end face of the carriage 101. The end cap 102 has formed therein a semicircular arc-shaped second circulation passage (not shown), which connects between the load-carrying race 13 and the first circulation passage 104. The seal 103 is disposed on an end face of the end cap 102.

In the linear motion guide unit 1, the load-carrying race 13, the first circulation passage 104, and the second circulation passages are connected to each other to form a looped circulation path. The linear motion guide unit 1 is a linear motion guide unit in which a plurality of balls 9 as the rolling elements circulate through the looped circulation path.

The rail 10 has raceway grooves 11 extending on both longitudinal side surfaces 29. Each raceway groove 11 has a groove 21 formed therein. The groove 21 has inserted therein a band 107 for retaining balls 9 in the slider 100. The band 107 is formed of a strip-shaped member. The band 107 has its both ends fixed to the end cap 102. The rail 10 has a through hole 16 formed for mounting to a base of a bed or other equipment. While the rail has a width of around 15 mm in the example in FIG. 1, the rail width is not particularly limited; a rail having a width of around 12 mm to 85 mm, for example, can be selected according to the purpose.

Figure 3:
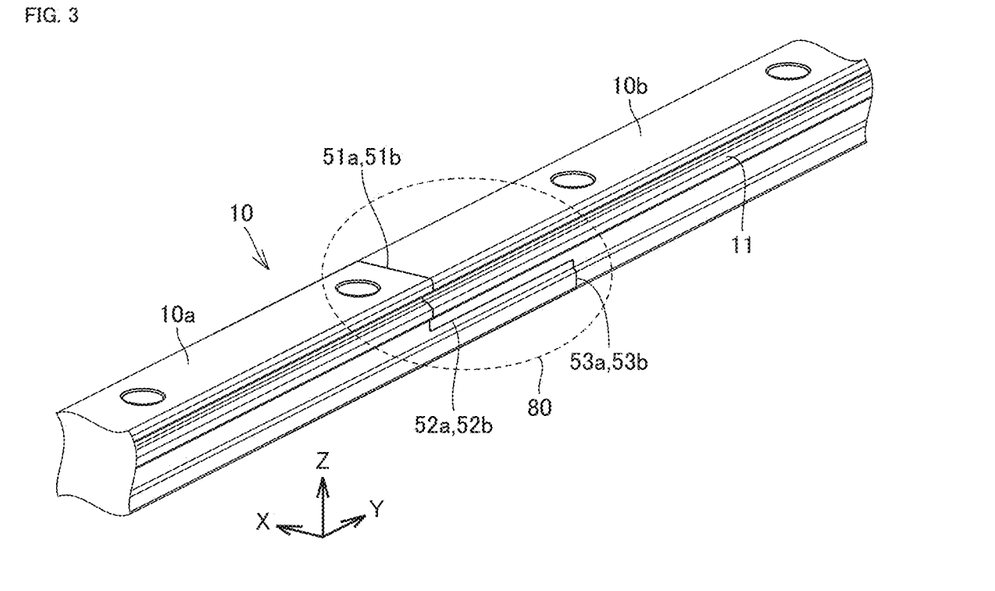
FIG. 3 shows a connecting portion of rail members in Embodiment 1.

FIG. 3 is an enlarged view of a portion of the rail 10 of the linear motion guide unit 1, showing a connecting portion 80. In FIG. 3, the rail width direction is the X-axis direction, the rail longitudinal direction is the Y-axis direction, and the rail thickness direction is the Z-axis direction. Referring to FIG. 3, the rail 10 is composed of a first rail member 10a and a second rail member 10b connected at the connecting portion 80. In the example of FIG. 3, the rail member 10a and the rail member 10b each have a length of 3000 mm. However, the length of the rail member is not limited thereto; a rail member having a length of around 1000 mm to 4000 mm, for example, can be selected according to the purpose. Further, while the number of rail members to be connected can be around two to three, it is not particularly limited; the number of rail members to be connected can be selected according to the purpose.

Figure 4:
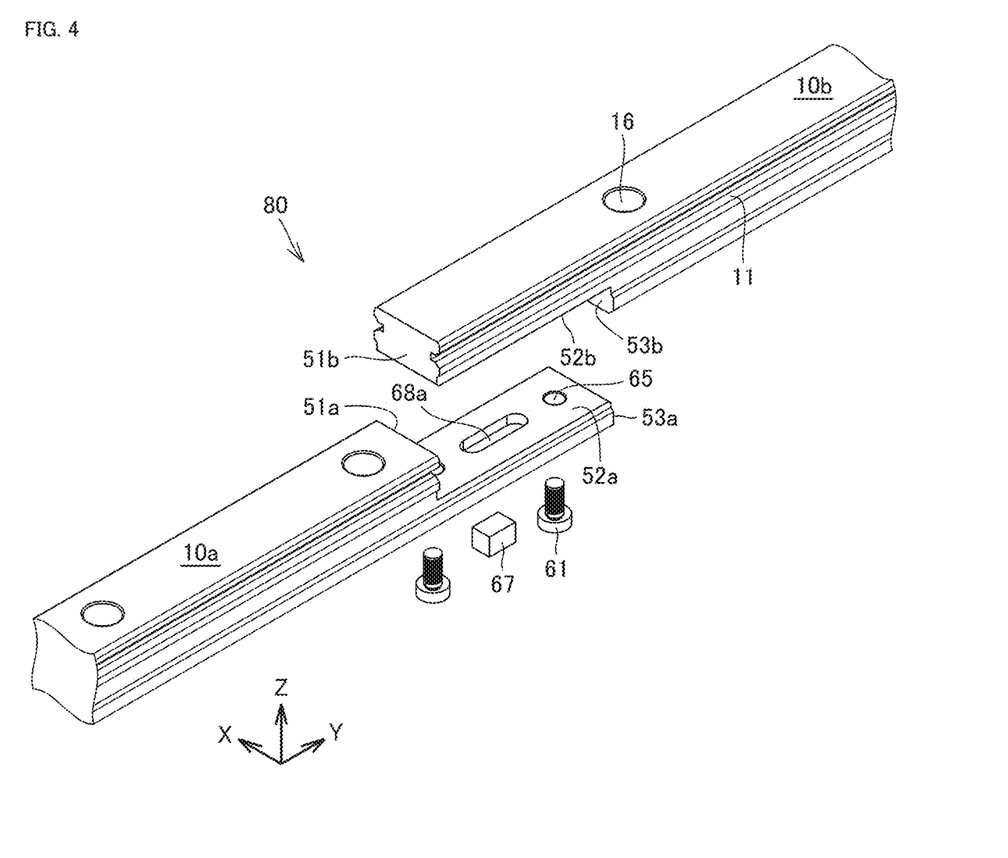
FIG. 4 shows, in an exploded view, the rail member connecting portion in Embodiment 1.

Referring to FIGS. 3 and 4, the first rail member 10a has a protrusion formed at its one end, which extends in the longitudinal direction. The second rail member 10b has a notch formed at its one end, which is to be combined with the protrusion of the first rail member 10a. The first rail member 10a has, at the protrusion on its end, two surfaces 51a and 53a parallel to the XZ plane and a surface 52a parallel to the XY plane and continuous with the two surfaces. The second rail member 10b has, at the notch on its end, two surfaces 51b and 53b parallel to the XZ plane and a surface 52b parallel to the XY plane and continuous with the two surfaces. The surfaces 51a and 51b, the surfaces 52a and 52b, and the surfaces 53a and 53b oppose each other. The rail member 10a and the rail member 10b are combined with each other with the surfaces 51a and 51b, the surfaces 52a and 52b, and the surfaces 53a and 53b opposing each other. The opposing surfaces 51a/51b and the opposing surfaces 53a/53b constitute surfaces that are parallel to the XZ plane, i.e., surfaces that extend orthogonally to the length direction of the rail 10. The opposing surfaces 52a/52b constitute a surface that is parallel to the XY plane, i.e., a surface that extends orthogonally to the thickness direction of the rail 10. The opposing surfaces 52a/52b are located below the raceway groove 11 in the Z-axis direction (thickness direction) of the rail 10.

Figure 5:
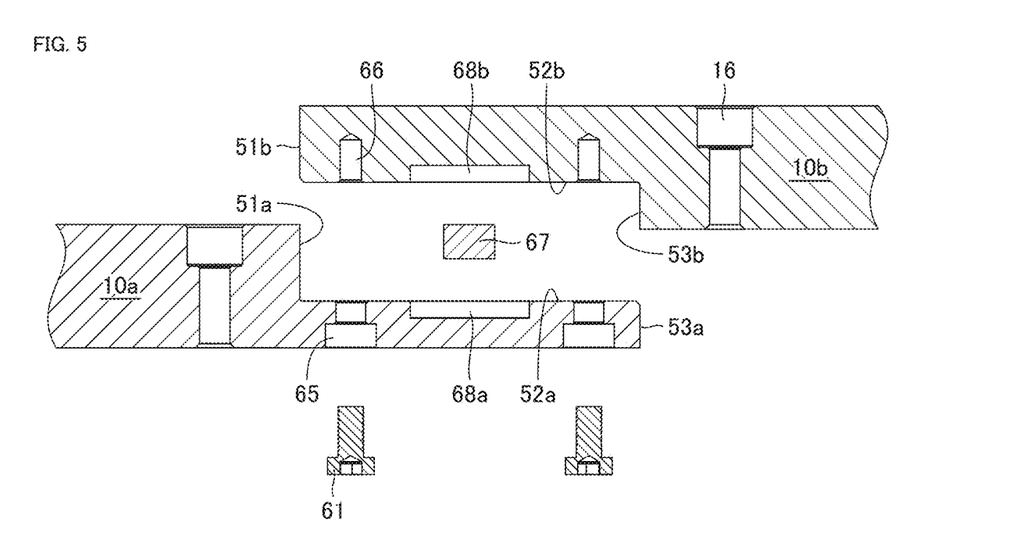
FIG. 5 shows, in an exploded view, a cross section of the rail member connecting portion in Embodiment 1.
Figure 6:
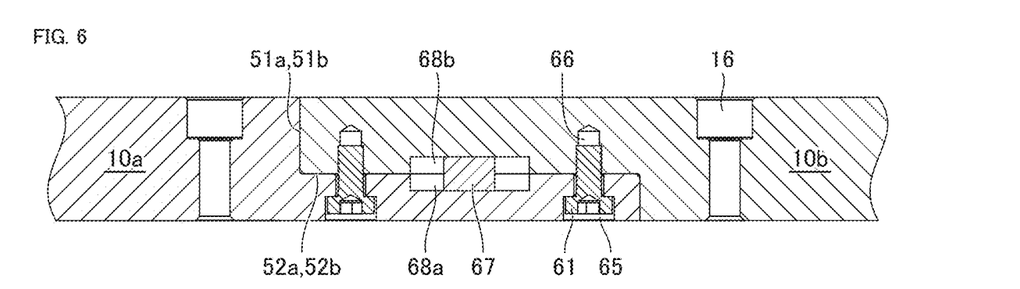
FIG. 6 shows a cross section of the rail member connecting portion in Embodiment 1.

FIG. 4 shows the configuration of the connecting portion 80 in an exploded view. Referring to FIGS. 4 to 6, the first rail member 10a and the second rail member 10b are fixed with a bolt 61, which is a screw as the columnar member inserted across the opposing surfaces 52a/52b. The first rail member 10a is provided with a counterbored hole 65. The second rail member 10b is provided with a screw hole 66. The bolt 61 is inserted into the counterbored hole 65 and the screw hole 66 for fastening. The bolt 61 is fastened so as to extend in a direction intersecting the longitudinal direction of the rail 10. While the bolts 61 are arranged at two locations along the length direction of the rail 10 in Embodiment 1, the number and arrangement of the bolts 61 are not limited thereto. The number and arrangement of the bolts 61 can be changed according to the length and width of the rail members, the shape of the opposing surfaces in the combined state, and the like. Further, although each bolt 61 is inserted upwardly from the bottom surface of the rail 10 in Embodiment 1, the first rail member 10a may be provided with a screw hole and the second rail member 10b may be provided with a counterbored hole, and the bolt may be inserted downwardly from the top surface of the rail 10.

Referring to FIGS. 4 to 6, in the connecting portion 80, the first rail member 10a and the second rail member 10b have keyways 68a and 68b, respectively, which are recesses. The keyways 68a and 68b are long round recesses that are provided in opposite positions on the opposing surfaces 52a/52b. A key 67 is a die-shaped metal component. Inserting the key 67 into the keyways 68a and 68b enables accurate positioning of the first rail member 10a and the second rail member 10b when connecting them.

Referring to FIG. 3, in the connecting portion 80 of the rail 10, the first rail member 10a and the second rail member 10b are connected with the bolts 61 that extend in a direction intersecting the longitudinal direction of the rail 10. With this, even when a force to separate the first rail member 10a and the second rail member 10b in the longitudinal direction is applied, the first rail member 10a and the second rail member 10b will hardly come off from each other in the longitudinal direction. There is no joint in the rail 10 that linearly traverses the entire circumference of the rail. This configuration may reduce the degradation in rail rigidity at the connecting portion 80. The connecting portion 80 connects and fixes the rail member 10a and the rail member 10b at the opposing surfaces 52a/52b. With this configuration, a larger area can be secured for the fixing surfaces than in the case where the end faces of the rail members are fixed together, allowing the rail members to be fixed to each other more securely. Therefore, for example even when an external force is applied in the longitudinal direction during the grinding of the raceway grooves, misalignment of the rail members is unlikely to occur. In addition, distortion of the rail during the use of the linear motion guide unit may be prevented.

While the balls 9 constitute the rolling elements in Embodiment 1, the rolling elements are not limited to the balls. Rollers can also be used as the rolling elements.

Embodiment 2

Figure 7:
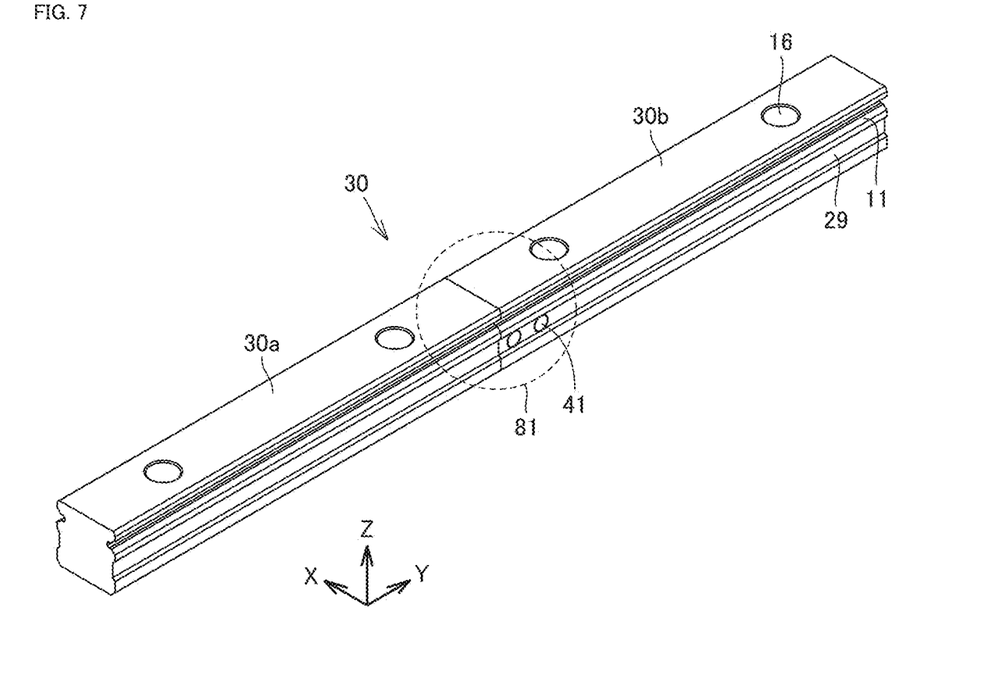
FIG. 7 shows a connecting portion of rail members in Embodiment 2.
Figure 8:
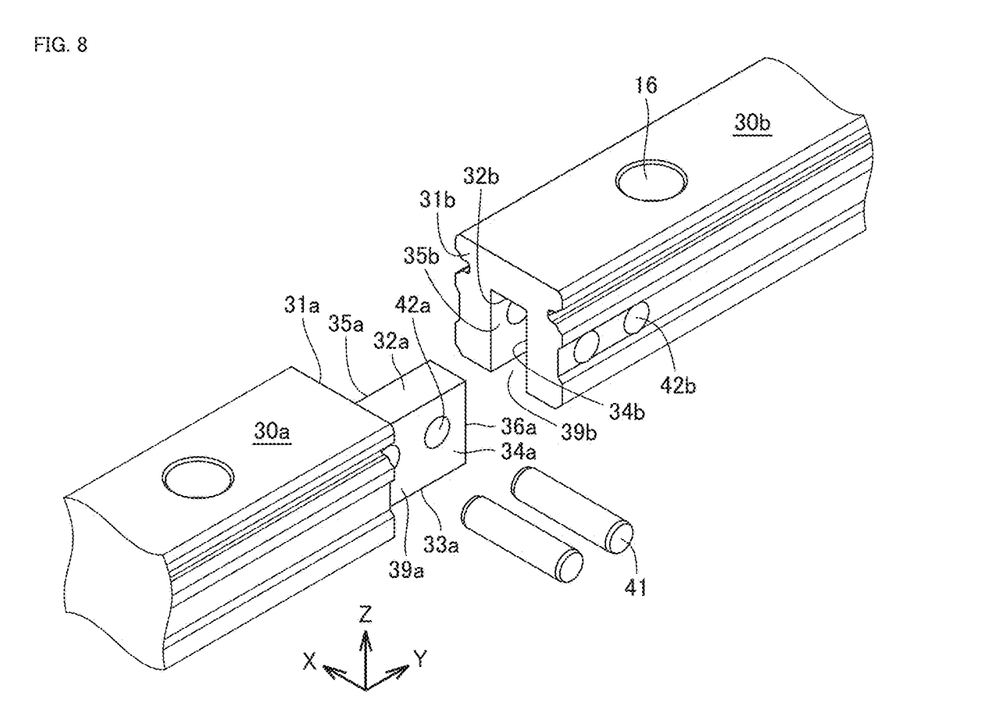
FIG. 8 shows, in an exploded view, the rail member connecting portion in Embodiment 2.
Figure 9:
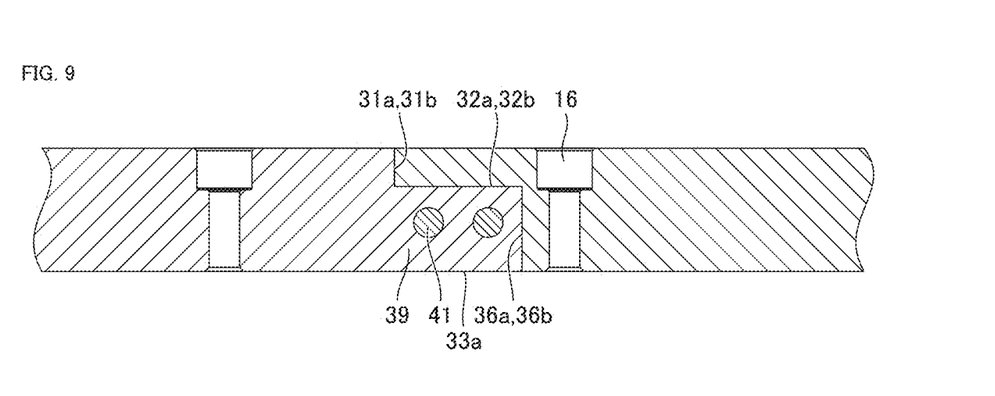
FIG. 9 shows a cross section of the rail member connecting portion in Embodiment 2.

FIGS. 7 to 9 show a second embodiment of the present disclosure. Referring to FIG. 7, a rail 30 has a first rail member 30a and a second rail member 30b connected at a connecting portion 81. In FIG. 7, the rail width direction is the X-axis direction, the rail longitudinal direction is the Y-axis direction, and the rail thickness direction is the Z-axis direction. In Embodiment 2, the first rail member 30a and the second rail member 30b each have a length of 3000 mm. However, the length of the rail member is not limited thereto; a rail having a length of around 1000 mm to 4000 mm, for example, can be selected according to the purpose. Further, while the number of rail members to be connected can be around two to three, it is not particularly limited; the number of rail members to be connected can be selected according to the purpose.

The first rail member 30a has a protrusion formed at its one end, which extends in the longitudinal direction of the rail. The second rail member 30b has a notch formed at its one end, which is to be combined with the protrusion of the first rail member 30a. The first rail member 30a and the second rail member 30b are combined in the form of so-called mortise and tenon joint. The first rail member 30a has, at its end face 31a, a prismatic protrusion 39a that protrudes in the longitudinal direction. The prismatic protrusion 39a has two surfaces 32a and 33a parallel to the XY plane (or, orthogonal to the thickness direction of the rail), two surfaces 34a and 35a parallel to the YZ plane (or, parallel to the longitudinal side surfaces of the rail), and one surface 36a parallel to the XZ plane (or, orthogonal to the longitudinal direction of the rail). The surface 33a is flush with the bottom surface of the rail member 30a.

The second rail member 30b has, at its end face 31b, a concave portion 39b formed to be combined with the protrusion 39a. The concave portion 39b has one surface 32b parallel to the XY plane (or, orthogonal to the thickness direction of the rail), two surfaces 34b and 35b parallel to the YZ plane (or, parallel to the longitudinal side surfaces of the rail), and one surface 36b parallel to the XZ plane (or, orthogonal to the longitudinal direction of the rail).

The first rail member 30a and the second rail member 30b are opposite to each other at the surfaces 31a/31b, the surfaces 32a/32b, the surfaces 34a/34b, the surfaces 35a/35b, and the surfaces 36a/36b. The opposing surfaces 32a/32b constitute a surface that is parallel to the XY plane, i.e., a surface that extends orthogonally to the thickness direction of the rail 30.

On the surfaces 34a and 35a of the first rail member 30a opposing the second rail member 30b, a pin hole 42a is provided that penetrates the rail 30 in the width direction between the surface 34a and the surface 35a. The rail member 30b is provided with pin holes 42b, at positions corresponding to the pin hole 42a, that traverse the rail member 30b in the width direction of the rail 30. Through the pin holes 42a and 42b, a pin 41 as the columnar member is inserted.

The pin 41 is inserted in the X-axis direction of the rail 30, i.e. in the width direction of the rail 30, or in other words, in a direction intersecting the longitudinal direction of the rail 30. The pin 41 extends in a direction traversing the opposing surfaces 34a/34b and the opposing surfaces 35a/35b of the first rail member 30a and the second rail member 30b. While the pins 41 are arranged at two locations orthogonally to the Y-axis direction (longitudinal direction of the rail 30) in Embodiment 2, the number and arrangement of the pins 41 are not limited thereto. The number and arrangement of the pins 41 can be changed according to the length and width of the rail members, the shape of the opposing surfaces in the combined state, and the like. For example, a larger number of pins (e.g., 3 to 10 pins) may be arranged in the Y-axis direction. Alternatively, a total of four pins may be inserted, at two locations in the Y-axis direction and two locations in the Z-axis direction.

While the pin 41 is a cylindrical pin, besides the cylindrical (straight type) pin, a tapered pin can be used as well. While the length of the pin 41 is approximately equal to the width of the rail 30 and the pin 41 extends over the entire width of the rail 30, the length of the pin 41 is not limited thereto. For example, a pin having a length smaller than the width of the rail 30 may be used, so that when the pin 41 is inserted, the pin 41 fits within the width of the rail 30 and does not protrude from the side surfaces of the rail 30.

The pin 41 extends in a direction orthogonal to the longitudinal direction of the rail 30. This prevents the rail members from shifting in the longitudinal direction when the connecting portion of the rail members is subjected to grinding. Further, according to Embodiment 2, following the production of rail members having shapes capable of combining with each other, the rail members can be combined together to form a hole at one time. This configuration is advantageous in terms of combination accuracy in the machining of holes and reduction of man-hours in production. Furthermore, according to Embodiment 2, there is no joint extending in the longitudinal direction of the rail on the outer surface of the rail.

Embodiment 3

Figure 10:
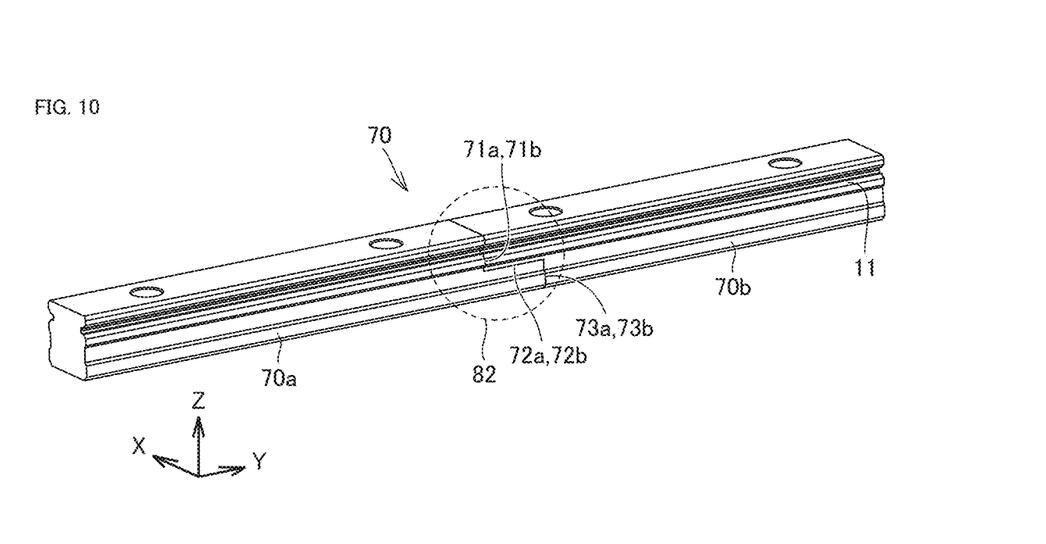
FIG. 10 shows a connecting portion of rail members in Embodiment 3.
Figure 11:
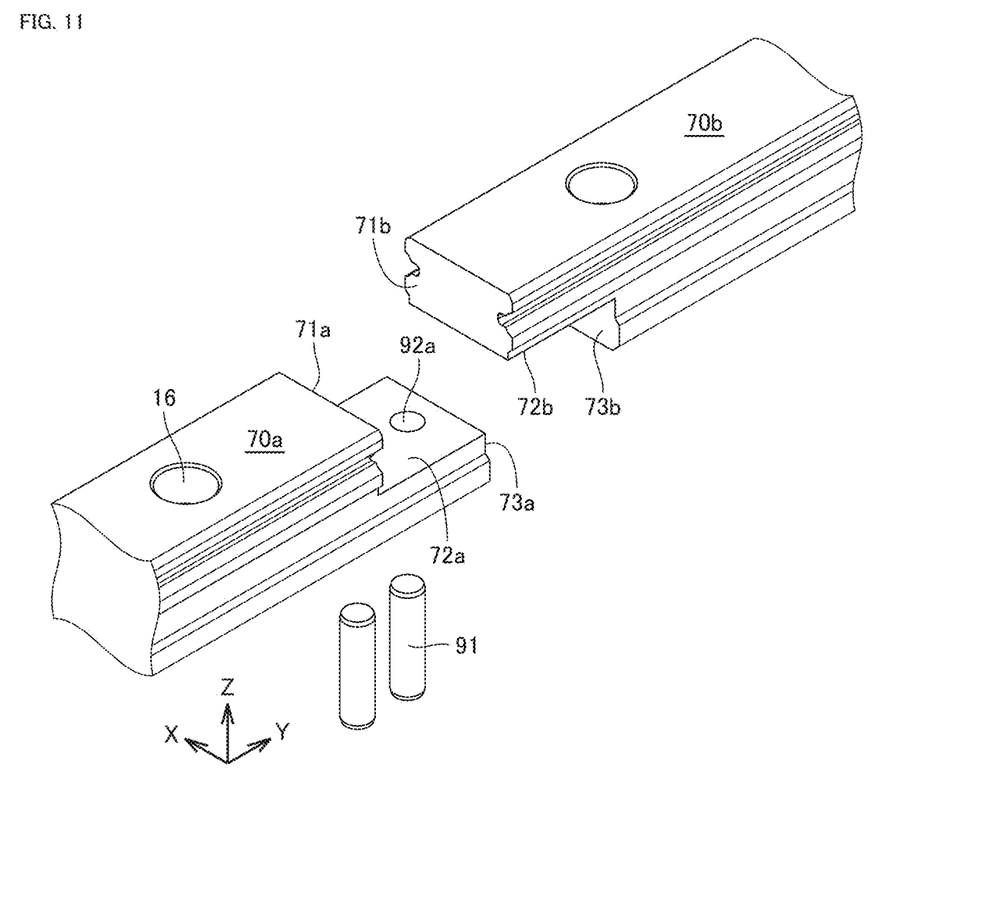
FIG. 11 shows, in an exploded view, the rail member connecting portion in Embodiment 3.
Figure 12:
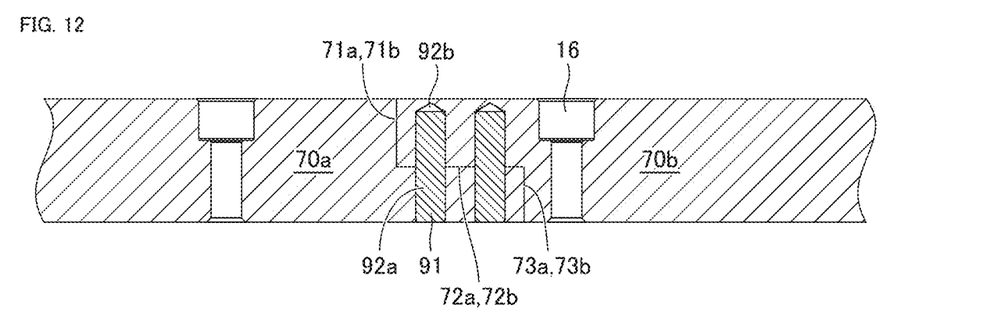
FIG. 12 shows a cross section of the rail member connecting portion in Embodiment 3.

FIGS. 10 to 12 show a third embodiment of the present disclosure. Referring to FIG. 10, a rail 70 has a first rail member 70a and a second rail member 70b connected at a connecting portion 82. In FIG. 10, the rail width direction is the X-axis direction, the rail longitudinal direction is the Y-axis direction, and the rail thickness direction is the Z-axis direction.

Referring to FIGS. 10 to 12, the first rail member 70a has a protrusion formed at its one end, which extends in the longitudinal direction of the rail. The second rail member 70b has a notch formed at its one end, which is to be combined with the protrusion. The first rail member 70a has, at the end, two surfaces 71a and 73a parallel to the XZ plane, and a surface 72a parallel to the XY plane and continuous with the two surfaces. The second rail member 70b has, at the end, two surfaces 71b and 73b parallel to the XZ plane, and a surface 72b parallel to the XY plane and continuous with the two surfaces. The surfaces 71a and 71b, the surfaces 72a and 72b, and the surfaces 73a and 73b are opposite to each other. The rail member 70a and the rail member 70b are combined with each other with the surfaces 71a and 71b, the surfaces 72a and 72b, and the surfaces 73a and 73b opposing each other. The opposing surfaces 71a/71b and the opposing surfaces 73a/73b constitute surfaces that are parallel to the XZ plane, i.e., surfaces that extend in the width direction of the rail 70. The opposing surfaces 72a/72b constitute a surface that is parallel to the XY plane, i.e., a surface that is orthogonal to the thickness direction of the rail 10. The opposing surfaces 72a/72b are located below a raceway groove 11 in the Z-axis direction of the rail 70.

FIG. 11 shows the configuration of the connecting portion 82 in an exploded view. The first rail member 70a and the second rail member 70b are fixed with a pin 91 which is the columnar member inserted across the opposing surfaces 72a and 72b. The pin 91 is inserted in a direction intersecting the longitudinal direction of the rail 70. The first rail member 70a has a pin hole 92a provided on the surface 72a. The pin hole 92a is a hole that penetrates in the thickness direction from the bottom surface to the surface 72a of the rail member 70a. The second rail member 70b is provided with a pin hole 92b. The pin hole 92b is provided in a position continuous to the pin hole 92a. The pin hole 92b is a concave portion that does not penetrate the second rail member 70b; it extends from the surface 72b in the thickness direction of the second rail member 70b. The pin hole 92b has its end in the depth direction formed in a protruding shape.

The pin 91 is inserted and fitted into the pin holes 92a and 92b. Although the pins 91 are arranged at two locations along the length direction of the rail 70 in Embodiment 3, the number and arrangement of the pins 91 are not limited thereto. The number and arrangement of the pins 91 can be changed according to the length and width of the rail members, the shape of the opposing surfaces in the combined state, and the like. While the pins 91 are cylindrical (straight pins) in Embodiment 3, they may be tapered pins, externally threaded pins, stepped pins, or the like.

Further, in Embodiment 3, each pin 91 is inserted upwardly from the bottom surface of the rail 70 as shown in FIG. 11. However, besides this manner, for example, a pin hole may be provided to penetrate through the second rail member 70b and a bottomed pin hole may be provided in the first rail member 70a, and the pin may be inserted downwardly from the top surface of the rail 70.

Referring to FIG. 10, according to Embodiment 3, at the connecting portion 82 of the rail 70, there is no rail joint that linearly traverses the entire circumference of the rail 70. This configuration may reduce the degradation in rail rigidity at the connecting portion 82. Further, according to the connecting portion 82, the rail member 70a and the rail member 70b are connected and secured at the opposing surfaces 72a and 72b. That is, a larger area can be secured for the fixing surfaces than in the case where the longitudinal end faces of the rail members are fixed to each other, and the rail members can be fixed to each other more securely by arranging a plurality of pins 91. Therefore, even when an external force is applied in the longitudinal direction during the grinding of the raceway grooves, misalignment of the rail members is unlikely to occur.

Besides the above-described embodiments, the form of the combination of opposing surfaces of rail members can further be changed. For example, end faces of adjacent rail members may be provided with notches cut off halfway in the width direction over a certain length. In this case, the rail members can be fixed to each other by inserting a screw or a pin orthogonally to their opposing surfaces that are parallel to the longitudinal side surfaces of the rail.

<Producing Method>

In the linear motion guide unit of the present disclosure, the slider has a conventionally known configuration and may be produced through a known producing method. For example, the slider can have a carriage made of steel or the like, and an end cap and a seal made of resin. Steel balls can be used for the rolling elements (balls).

In the present disclosure, the rail of the linear motion guide unit can be made of a stainless steel or carbon steel plate machined to a predetermined shape. The rail can be produced in accordance with known conditions and methods. The end faces of the rail members to be connected are machined to predetermined shapes using a machining center, for example. Next, with the rail members formed to have the predetermined end shapes being abutted against each other, a pin hole is formed. Then, a separately prepared pin is inserted, thereby connecting the rail members together.

Figure 13:
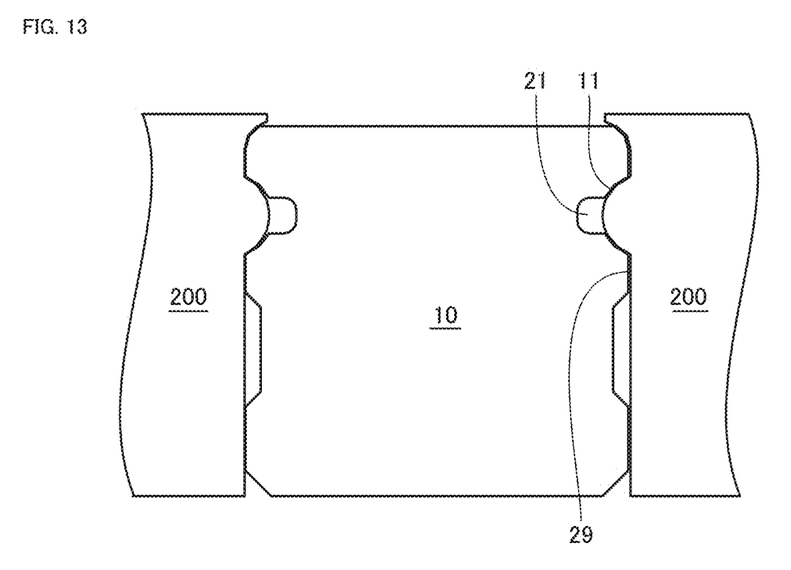
FIG. 13 shows how a grinding stone is abutted against a rail during a process of grinding the rail of a linear motion guide unit.

For the grinding process, referring to FIG. 13, a grinding stone 200 preformed to conform to a desired side profile of the rail can be used. During the grinding process, the grinding stone 200 advances in the longitudinal direction of the rail while abutting against the surfaces of the raceway grooves and the side surfaces of the rail.

It should be understood that the embodiments disclosed herein are illustrative and non-restrictive in every respect. The scope of the present disclosure is defined by the terms of the claims, rather than the description above, and is intended to include any modifications within the scope and meaning equivalent to the terms of the claims.

DESCRIPTION OF REFERENCE NUMERALS

1: linear motion guide unit; 10, 30, 70: rail; 10a, 10b, 30a, 30b, 70a, 70b: rail member; 11, 12: raceway groove; 13: load-carrying race; 16, 106: hole; 21: groove; 29: longitudinal side surface; 39a: protrusion; 39b: concave portion; 41, 91: pin; 42a, 42b, 92a, 92b: pin hole; 61: bolt; 65: counterbored hole; 66: screw hole; 67: key; 68a, 68b: keyway; 80, 81, 82: connecting portion; 100: slider; 101: carriage; 102: end cap; 103: seal; 104: first circulation passage; 107: band; 108: bolt; 110: upper portion; 120: sleeve portion; 31a, 32a, 33a, 34a, 35a, 36a, 31b, 32b, 34b, 35b, 36b, 51a, 52a, 53a, 51b, 52b, 53b, 71a, 72, 73a, 71b, 72b, 73b: surface; 9: ball; and 200: grinding stone.

What is claimed is:

1. A linear motion guide unit comprising:
a rail having at least two longitudinal side surfaces and a raceway groove extending on each longitudinal side surface;
a slider fitting over the rail and movable relative to the rail;
the rail including a first rail member and a second rail member connected to each other in a longitudinal direction at a connecting portion,
the first rail member having, at least at one end, a protrusion extending in the longitudinal direction,
the second rail member having, at least at one end, a notch to be combined with the protrusion,
in the connecting portion:
the first rail member having an opposing surface,
the second rail member having an opposing surface facing the opposing surface of the first rail member,
the protrusion of the first rail member being combined with the notch of the second rail member to connect the first rail member and the second rail member,
the protrusion and the notch being fixed with a columnar member extending in a direction intersecting the longitudinal direction and inserted across the opposing surfaces of the first rail member and the second rail member.

2. The linear motion guide unit according to claim 1, wherein the columnar member is a pin or a screw.

3. The linear motion guide unit according to claim 1, wherein the direction in which the columnar member extends is a direction orthogonal to the longitudinal direction of the rail.

4. The linear motion guide unit according to claim 3, further comprising a key, wherein
   the opposing surface of the first rail member and the opposing surface of the second rail member each having formed therein a recess corresponding to the key, and
   the key is fitted in the recesses.

5. The linear motion guide unit according to claim 1, wherein the columnar member is a screw,
   the opposing surface of the first rail member having a counterbored hole formed therein, the opposing surface of the second rail member having a screw hole formed therein, and
   the screw is inserted and screwed into the screw hole and the counterbored hole to connect the first and second rail members.

6. The linear motion guide unit according to claim 1, wherein the columnar member is a pin,
   the opposing surface of the first rail member and the opposing surface of the second rail member each having a pin hole formed therein, and
   the pin is inserted into the pin holes to connect the first and second rail members.

7. The linear motion guide unit according to claim 1, further comprising a key, wherein
   the opposing surface of the first rail member and the opposing surface of the second rail member each having formed therein a recess corresponding to the key, and
   the key is fitted in the recesses.

8. The linear motion guide unit according to claim 1, wherein the connecting portion includes a plurality of surfaces orthogonal to the longitudinal side surfaces of the rail and the columnar portion intersects and is inserted across at least one set of opposing surfaces in the connecting portion.

* * * * *